(12) United States Patent
Camunez et al.

(10) Patent No.: US 9,176,493 B2
(45) Date of Patent: Nov. 3, 2015

(54) SYSTEM FOR MANAGING AN AUTOMATION SYSTEM

(75) Inventors: Jesus Camunez, Esplugues Llobregat (ES); Aleix Montes, Barcelona (ES); Antonio Ortiz, Barcelona (ES)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 538 days.

(21) Appl. No.: 13/617,382

(22) Filed: Sep. 14, 2012

(65) Prior Publication Data
US 2013/0079898 A1 Mar. 28, 2013

(30) Foreign Application Priority Data
Sep. 26, 2011 (FR) ...................................... 11 58546

(51) Int. Cl.
*G05B 19/042* (2006.01)
*G06F 9/44* (2006.01)

(52) U.S. Cl.
CPC .......... *G05B 19/042* (2013.01); *G05B 19/0426* (2013.01); *G06F 8/24* (2013.01); *G05B 2219/23292* (2013.01)

(58) Field of Classification Search
CPC ...................................................... G06F 8/24
See application file for complete search history.

(56) References Cited

U.S. PATENT DOCUMENTS

| 6,643,555 | B1 | 11/2003 | Eller et al. | |
|---|---|---|---|---|
| 2007/0005171 | A1 | 1/2007 | Dietrich et al. | |
| 2007/0240069 | A1* | 10/2007 | Eldridge et al. | 715/763 |
| 2008/0189638 | A1* | 8/2008 | Mody et al. | 715/771 |

OTHER PUBLICATIONS

Mosterman, P.; Vangheluwe, H., "Computer Automated Multi-Paradigm Modeling in Control System Design" (Sep. 25-27, 2000), Proceedings of the 2000 IEEE International Symposium on Computer-Aided Control System Design, pp. 65-70 [retrieved from http://ieeexplore.ieee.org/stamp/stamp.jsp?tp=&arnumber=900188].*

(Continued)

*Primary Examiner* — Brian W Wathen
(74) *Attorney, Agent, or Firm* — Oblon, McClelland, Maier & Neustadt, L.L.P.

(57) ABSTRACT

Managing an automation system that includes software requires a projects manager, an applications manager, and a topologies manager. The applications manager includes a single object-oriented functional description of the automation system based on an object meta-model. The functional description includes a plurality of composite functional objects, each of which further include a monitoring facet and a supervision facet. The monitor facet and the supervision facet each include a mapping interface. The topologies manager includes an object-oriented topological description of the automation system based on the object meta-model, and includes a plurality of topological objects. The projects manager includes a monitoring project and a supervision project which relate to the automation system. Monitoring facets are assigned to the monitoring project and supervision facets are assigned to the supervision project. Part of the topological objects are mapped with the monitoring facets and the supervision facets via mapping interfaces.

12 Claims, 9 Drawing Sheets

(56) References Cited

OTHER PUBLICATIONS

Engstrom, E.; Krueger, J., "Building and Rapidly Evolving Domain-Specific Tools with DOME" (Sep. 25-27, 2000), Proceedings of the 2000 IEEE International Symposium on Computer-Aided Control System Design, pp. 83-88 [retrieved from http://ieeexplore.ieee.org/stamp/stamp.jsp?tp=&arnumber=900191].*

Strasser et al., "A Research Roadmap for Model-Driven Design of Embedded Systems for Automation Components" (Jun. 23-26, 2009), 7th IEEE International Conference on Industrial Informatics, pp. 564-569 [retrieved from http://ieeexplore.ieee.org/stamp/stamp.jsp?tp=&arnumber=5195865].*

Xuan Loc Pham Thi, "Adaptation des composants centrée sur l'utilisation" (2004), [including machine translation] Institut National Polytechnique de Toulouse, pp. 1-232 [translation 198 pages].*

French Preliminary Search Report with Written Opinion issued May 3, 2012, in French 1158546, filed Sep. 26, 2011.

Xuan Loc Pham Thi, "Adaptation des composants centree sur l'utilisation", These Universite de Toulouse, No. 2160, Nov. 15, 2004, 18 pages.

* cited by examiner

SYSTEM FOR MANAGING AN AUTOMATION SYSTEM

TECHNICAL FIELD OF THE INVENTION

The present invention relates to the field of automation systems and pertains in particular to a system comprising software for managing such automation systems.

PRIOR ART

Today, in order to manage a factory, a production line or any complex automation system, a plurality of programs or items of software are necessary. These various programs address varied elements of design logic and are in principle not interoperable.

Thus, in the prior art, a global software architecture comprising tools for managing an automation system is generally organized as successive strata ranging from low-level programming to global supervision. Programs designed and developed in a totally independent manner make it possible for each to manage an aspect of the management of the system: management of the inputs-outputs, management of the logic controllers, programming, monitoring of the processes, control of the equipment, supervision of the processes, etc. In this organization, by way of example, the software tool allowing the management of the "control/monitoring" aspect of the automation system and the software tool allowing the supervision of the processes or else the human-machine interfaces intended for the end user are not designed to be easily interconnected.

To be usable by an end user in the context of a complex automation system, this multitude of independent programs must form the subject of significant integration work. The resulting global architecture remains extremely complex and difficult for the end user to utilize.

Document U.S. Pat. No. 6,643,555 B1 describes a method for generating an application program for controlling an automation system, using in particular a physical model and a topological model representing said automation system. However, this document does not describe means allowing heterogeneous programs used for controlling, supervising etc. said automation system to coexist and cooperate within a unified environment.

To alleviate this major drawback of complexity of use for the end user, the present invention relates to a system, and in particular a software based on an object meta-model and comprising means for allowing independent software tools to cooperate within a unified architecture.

For this purpose, the present invention provides a software system based on object-oriented programming developed on the basis of a single object meta-model. Said single object meta-model is designed to allow at one and the same time the functional description and the topological description of an automation system. In the object meta-model implemented in the software according to the invention, functional objects intended to describe a functional aspect—for example monitoring—of the automation system considered can comprise "mapping" interfaces making it possible, during a specific step, to map said functional objects with topological objects intended to describe a topological aspect of the same automation system, said topological objects being configured, that is to say previously associated with their respective corresponding hardware. The "mapping" step thus consists in projecting the functional objects representing the logic of an automation system onto their respective hardware.

So, the single object meta-model allows to describe an automation system from a topological point of view and a functional point of view, especially through composite objects presenting various facets, these composite objects being capable of being called, edited or modified, etc. . . . , by various programs/software which, consequently, can interact during their running although they have not been designed for it.

DISCLOSURE OF THE INVENTION

To sum up, the invention consists in a system for managing an automation system comprising software including:
a projects manager;
an applications manager;
and a topologies manager;
said applications manager comprising a single object-oriented functional description of said automation system, based on an object meta-model, said functional description comprising a plurality of composite functional objects which each comprise a monitoring facet and a supervision facet, said monitoring and supervision facets comprising a mapping interface;
said topologies manager comprising an object-oriented topological description of said automation system, based on said object meta-model, and comprising a plurality of topological objects;
said projects manager comprising a monitoring project and a supervision project which relate to said automation system;
said monitoring facets being assigned to said monitoring project;
said supervision facets being assigned to said supervision project;
part of said topological objects being mapped with said monitoring and supervision facets of part of said composite functional objects by way of said mapping interfaces.

Advantageously, said automation system comprises a monitoring programmable logic controller able to run said monitoring project and a supervision computer able to run said supervision project.

Advantageously, said automation system comprises a database comprising said functional description and said topological description.

Advantageously, said composite functional objects may comprise logic interfaces for connecting together said monitoring and supervision facets that they comprise.

Advantageously, the system according to the invention also comprises composite topological objects consisting of at least two topological facets arising from a set of topological facets of a first type and from a set of topological facets of a second type.

Advantageously, said composite topological objects comprise physical interfaces for connecting together said topological facets that they comprise.

Advantageously, said topological objects comprise communication interfaces able to allow said topological objects to communicate with one another and to exchange data.

Advantageously, the system according to the invention also comprises an object models editor comprising means for creating said object meta-model comprising functional object models and topological object models.

Advantageously, the system according to the invention comprises a topologies editor comprising means of graphical editing of topologies for creating said topological description of the automation system.

Advantageously, the system according to the invention comprises a functional editor comprising means of functional graphical editing for creating said functional description of the automation system.

Advantageously, the system according to the invention comprises a mapping editor comprising graphical mapping means for mapping topological objects with functional facets comprising a mapping interface.

BRIEF DESCRIPTION OF THE FIGURES

Other features and advantages will appear in the detailed description which follows, offered with regard to the appended drawings which represent.

DETAILED DESCRIPTION OF AN EMBODIMENT

Figure 1:
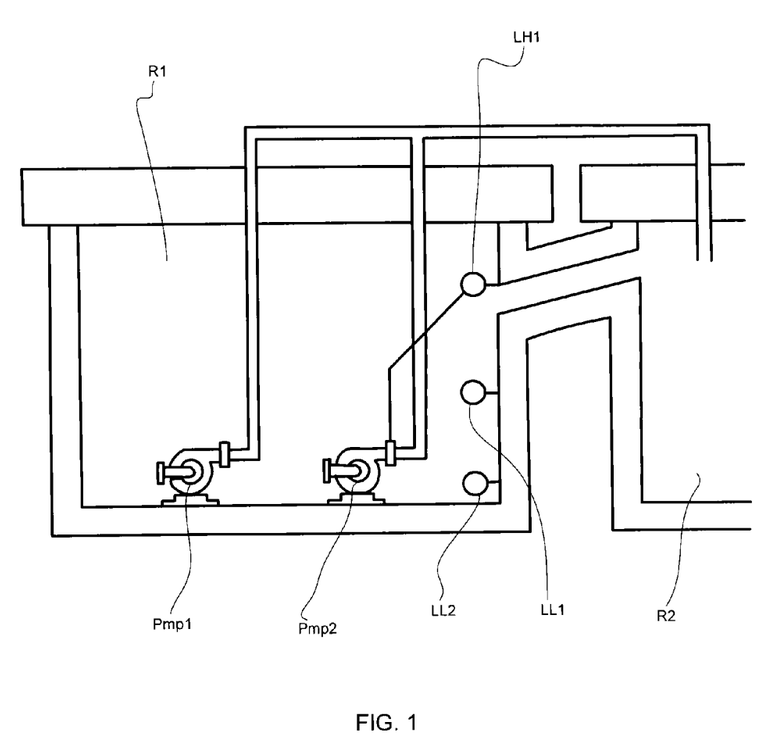
FIG. 1: the diagram of a simple exemplary automation system.

To illustrate the invention, the description which follows is based on the exemplary nonlimiting automation system represented schematically in FIG. 1. This example relates to a system of water tanks R1, R2 collecting rainwater. This system comprises two pumps Pmp1, Pmp2 for transferring the water from a first tank R1 to a second tank R2. It moreover comprises sensors LL1, LL2, LH1 for monitoring the water level in the first tank R1.

A first pump Pmp1 deals with the water level in the first and second tanks R1, R2, while a second pump Pmp2 takes over in the event that maintenance is in progress or a defect is detected on the first.

The three sensors monitor various fill levels of the first tank R1: very low LL2, low LL1, and high LH1. The sensor LL2 corresponding to the very low fill level is linked directly to the supply circuit of the two pumps Pmp1, Pmp2 so as to prevent said pumps from running under no load.

In the system according to the invention, this automation system is described on the basis of an object meta-model making it possible to undertake both a functional description and a topological description thereof.

Figure 2:
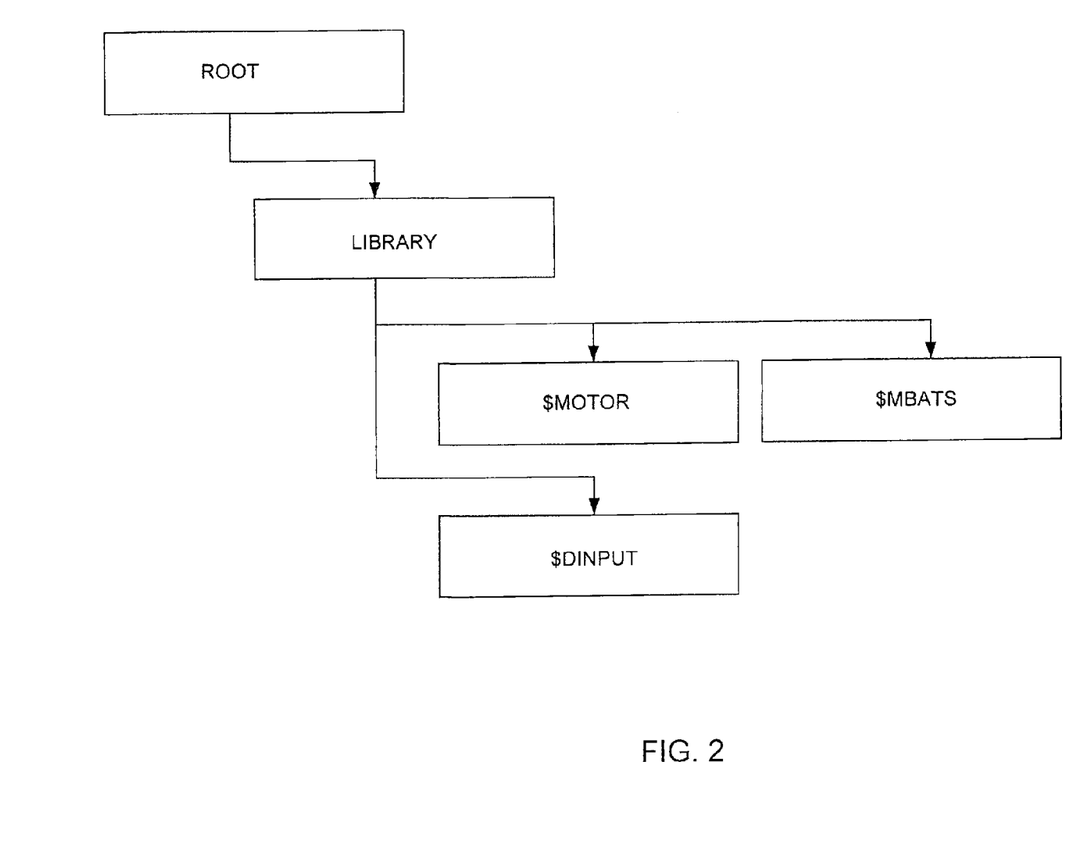
FIG. 2: a block diagram representing the creation of object models.

In practice, said meta-model comprises object models, corresponding to non-configured, abstract object-types. On the basis of these object models, a user can describe the automation system considered. For example, as represented in FIG. 2, the system according to the invention comprises a "$MOTOR" object model, a "$MBATS" object model, corresponding to a motor starter, and a "$DINPUT" object model, corresponding to objects of digital inputs/outputs type. These object models may be contained in a library of customizable object models, corresponding to the LIBRARY attached to the root ROOT of the software according to the invention, in FIG. 2. The two pumps Pmp1, Pmp2 are then described on the basis of the "$MOTOR" object model and of the "$MBATS" object model and the three sensors are described on the basis of the "$DINPUT" object model.

Figure 3:
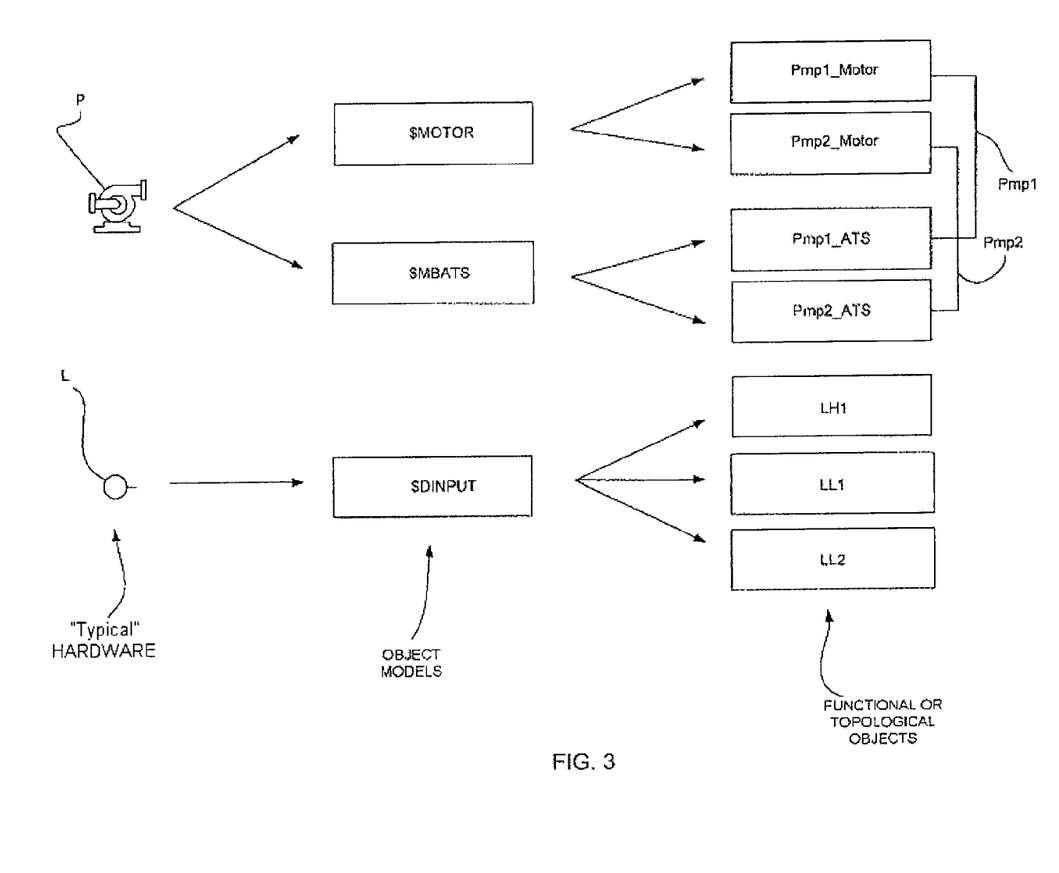
FIG. 3: a diagram representing the matching of real hardware of an automation system with objects of an object-oriented description of said automation system.
Figure 4:
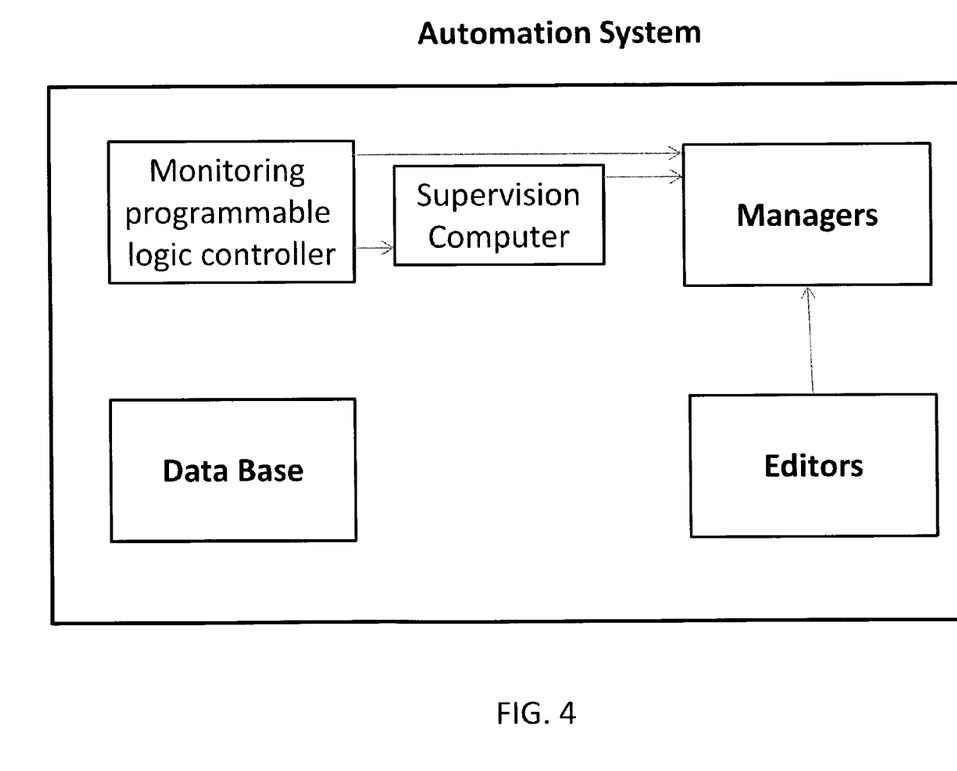
FIG. 4: a block diagram representing an example of an automation system.
Figure 5:
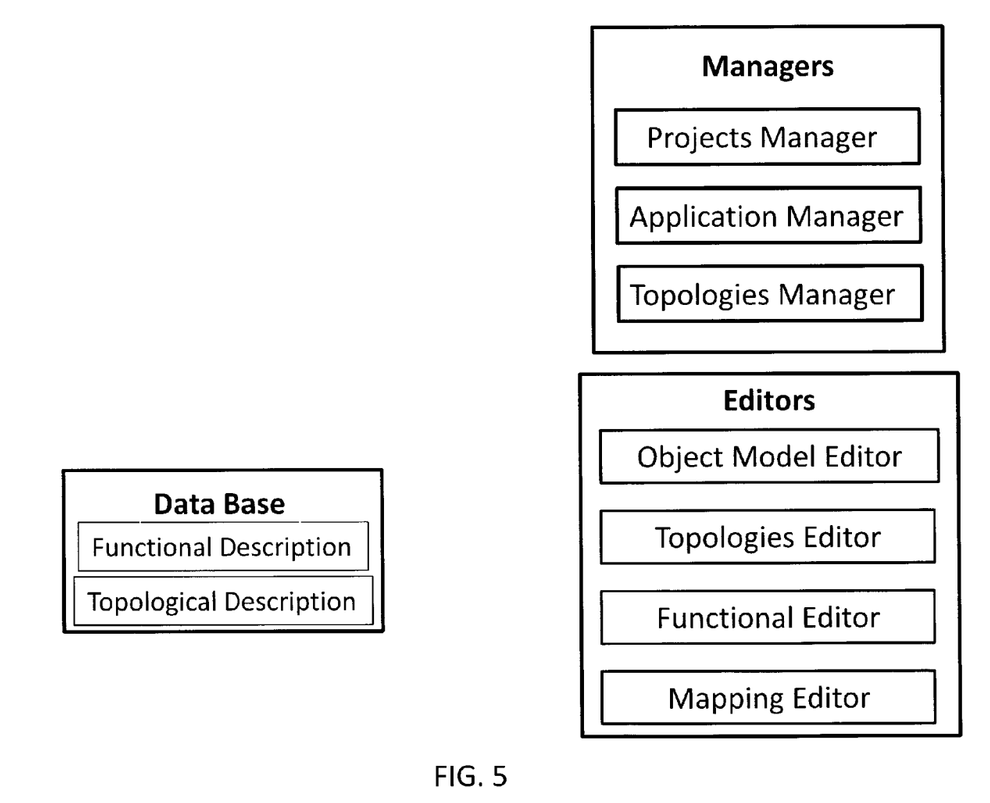
FIG. 5: a block diagram representing exemplary details of data base, managers, and editors shown in FIG. 4.
Figure 6:
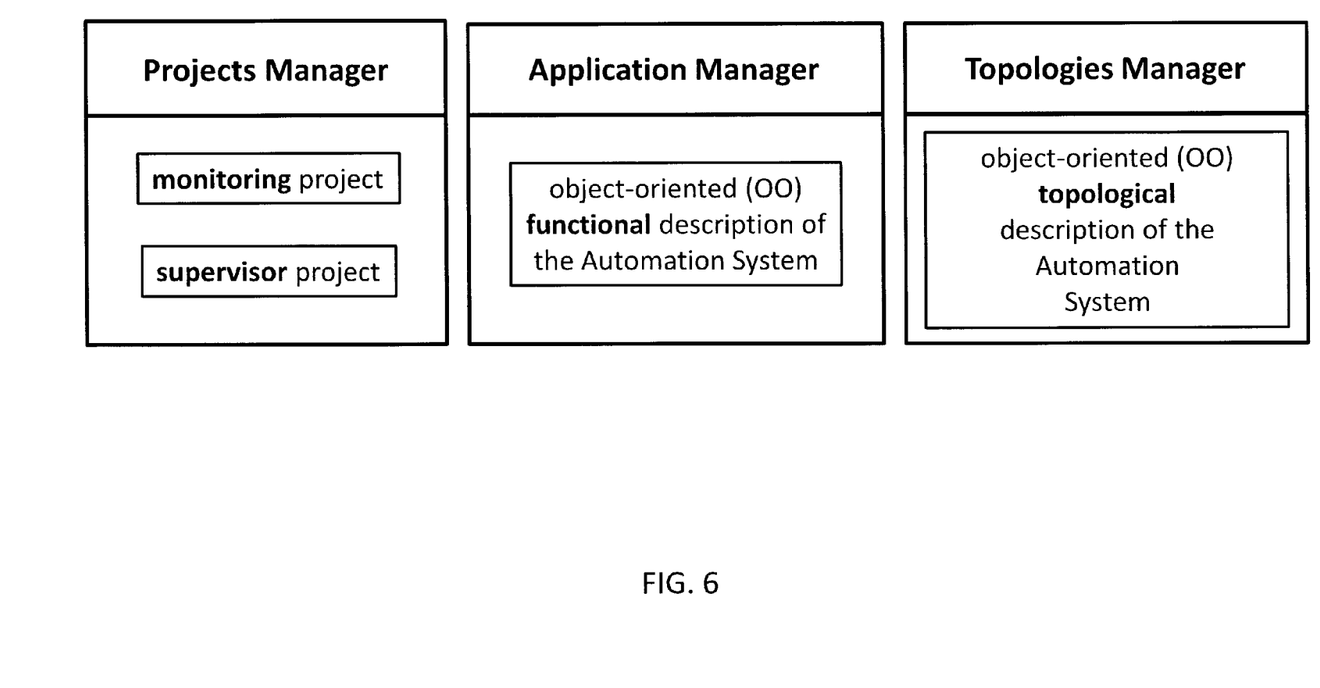
FIG. 6: a block diagram representing exemplary details of projects manager, application manager, and topologies manager shown in FIG. 5.
Figure 7:
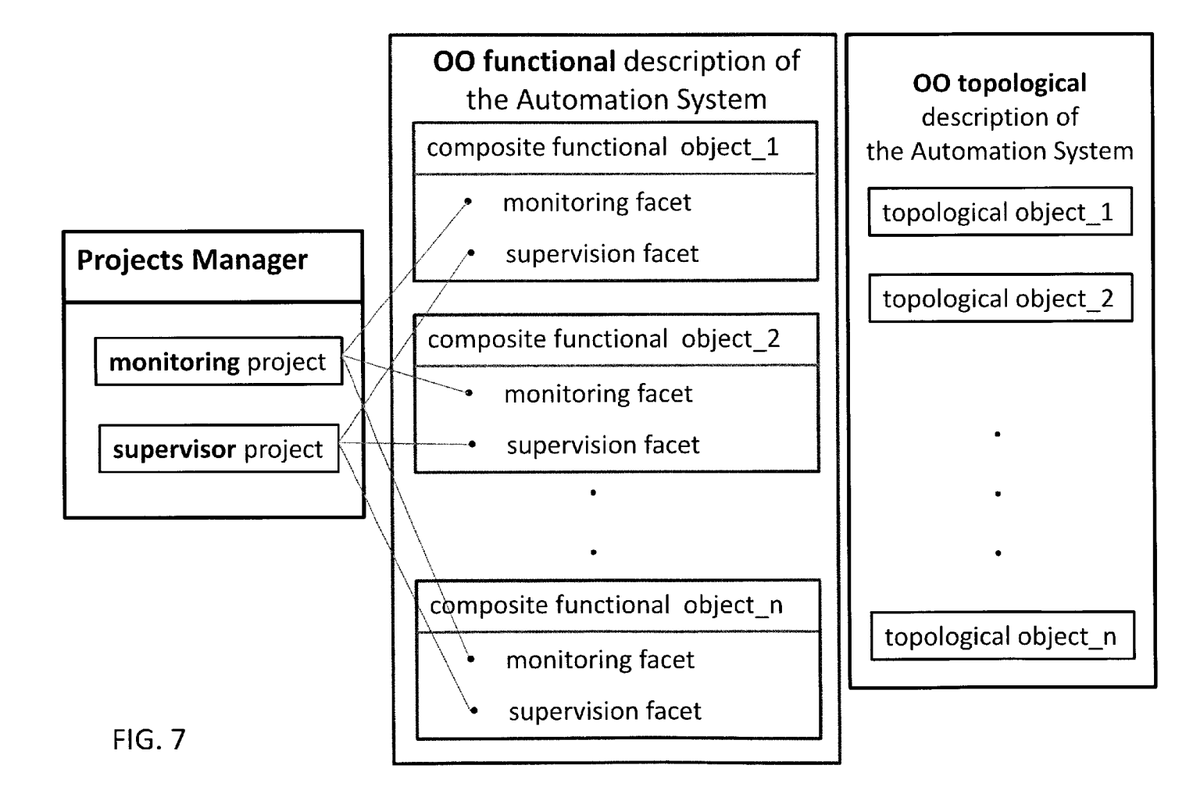
FIG. 7: a block diagram illustrating an exemplary assignments of monitoring facets and supervision facets to monitoring project and supervision project.
Figure 8:
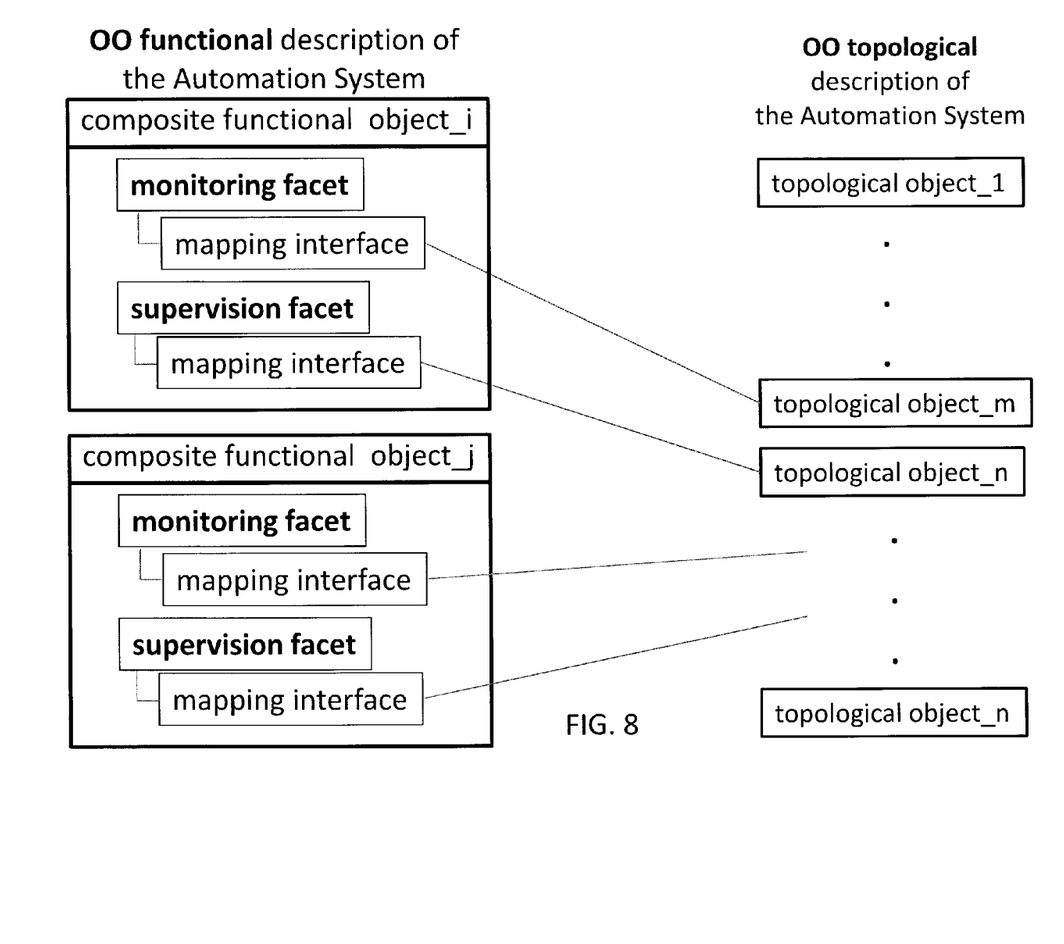
FIG. 8: a block diagram illustrating an exemplary mapping between topological objects and monitoring/supervision facets via mapping interfaces.
Figure 9:
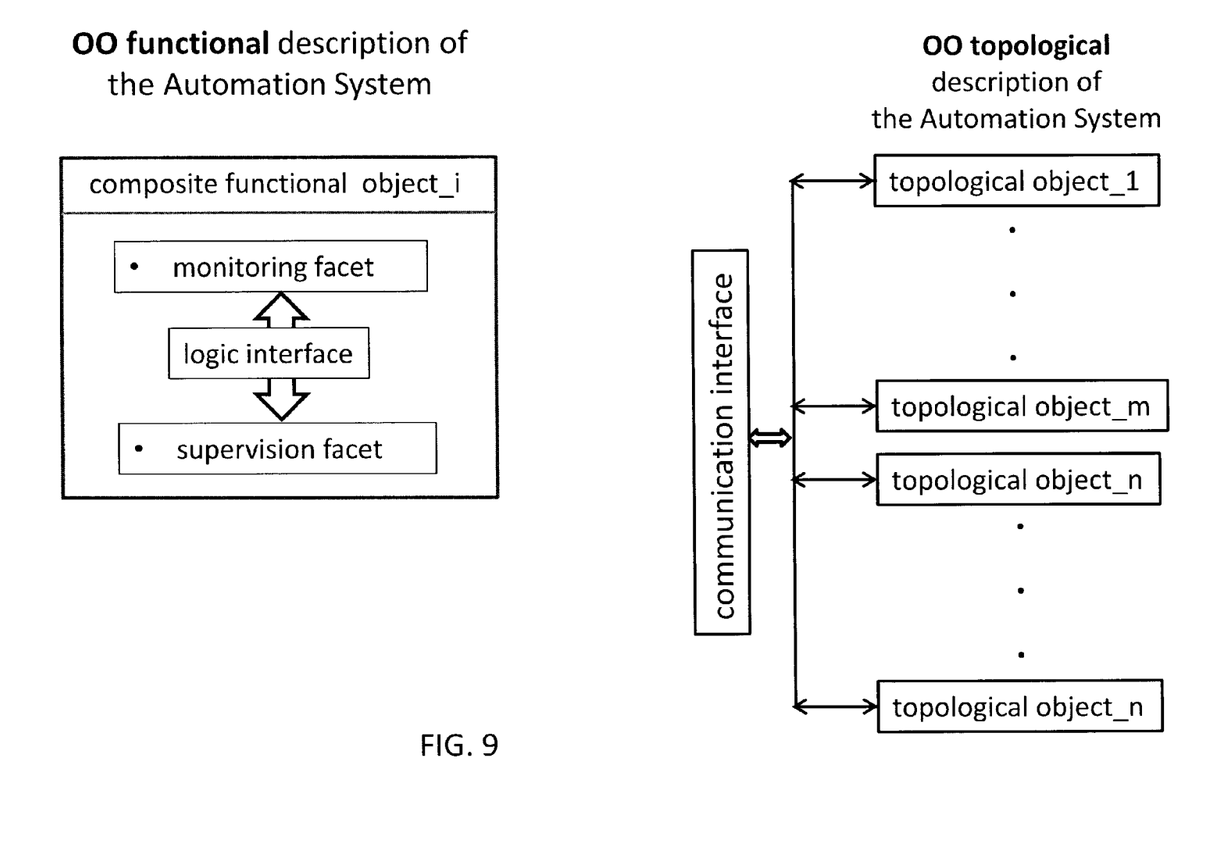
FIG. 9: a block diagram illustrating a logic interface connecting together a monitoring facet and a supervision facet, and a communication interface allowing communications and exchanges of data between topological objects.

As represented in FIG. 3, starting from these objects, arising from a single object meta-model, the system according to the invention makes it possible to carry out a functional description comprising functional objects and a topological description comprising topological objects of the automation system considered. A real hardware object, such as a pump P, is thus described with the aid of the "$MOTOR" and "$MBATS" object models. In the automation system considered, there are two pumps Pmp1 and Pmp2; two instances of each "$MOTOR" and "$MBATS" object model are therefore created to describe these two pumps, the instance of an object model being the tailoring of the latter to the automation system considered. The object-oriented description of the automation system therefore comprises, for the first pump Pmp1, an instance for the starter named Pmp1_ATS and an instance for the motor named Pmp1_Motor, and for the second pump Pmp2, an instance for the starter named Pmp2_ATS and an instance for the motor named Pmp2_Motor. In the same manner, three instances of the "$DINPUT" object model able to represent hardware objects of sensor type are created, corresponding to the three sensors LL1, LL2 and LH1 of the automation system considered. These object-oriented descriptions are intended to be stored in a database.

Moreover, an essential feature of the system according to the invention is that it enables independent software tools to coexist, making it possible in particular to manage, for example, the aspects of monitoring and supervision of the automation system by way of two different software tools. According to the invention, the functional description of the automation system then comprises functional objects of composite type including various functional sub-objects of facet or composite type, such as for example a monitoring facet and a supervision facet. The communication between the various functional objects of composite and facet type is established by way of another type of object models dubbed interfaces.

Thus, on the basis of a single object meta-model, starting for example from the "$MOTOR", "$MBATS" and "$DINPUT" object models, the user of the system according to the invention defines on one side the monitoring facets for constructing the monitoring aspect of the functional description of the automation system and on another side the supervision facets for constructing the supervision aspect of the same functional description of the same automation system. The assemblage of a monitoring facet and of a supervision facet for one and the same object constitutes a composite functional object. The user can also associate functional composite objects with one another to form more complex functional composite objects.

On the basis of the same "$MOTOR", "$MBATS" and "$DINPUT" object models, the user of the system according to the invention moreover defines the topological facets for constructing the topological description, that is to say the description of the hardware architecture, of the automation system considered. The assemblage of two topological facets of one and the same object constitutes a composite topological object. The user can also associate functional composite objects with one another to form more complex functional composite objects.

The single object meta-model also includes "interface" objects. Four types of interfaces exist:
  logic interfaces making it possible to interconnect functional objects with one another, and in particular, for example, a monitoring facet with a supervision facet;
  physical interfaces making it possible to interconnect topological objects with one another;
  communication interfaces allowing topological objects to communicate with one another;
  mapping interfaces making it possible to associate functional objects with topological objects, in particular for example a monitoring or supervision object with a topological object.

The interfaces are, according to their type, optional attributes of the functional or topological, facet or composite objects.

For its implementation, the system according to the invention comprises various "managers", for example graphical editors, which can correspond to various views, to various browsers within one and the same software, or to distinct programs able to cooperate within a unified or integrated human-machine interface.

The first graphical editor that can be implemented is an object models editor. The object models editor makes it possible to create "typical" objects, facets, composites or interfaces, bundled into libraries of object models available to the user.

In an applications manager, the user is, for example with the aid of a functional-description editor having means of graphical editing, able to configure functional objects and to create, in particular, monitoring facets and supervision facets that can be assembled into composite functional objects, so as to carry out a complete functional description of the automation system. This functional description has the advantage of presenting various angles, corresponding to the various software tools affording management of the automation system. For example, the "monitoring" aspect of the automation system is described through monitoring facets while the "supervision" aspect is described by way of supervision facets.

The system according to the invention comprises a topologies manager which makes it possible, by way of a topological-description editor having means of graphical editing, to carry out and to configure the complete topological description of the automation system. Starting from the libraries of object models, the user determines the topological description of the automation system and carries out the configuration thereof. This configuration step consists in associating the topological objects of the topological description with the "real" hardware. Thus, the pumps of the object model are associated with well-determined, within the hardware sense, pumps of the automation system. The same goes for the sensors. Moreover, the automation system may be managed by a logic controller, represented by an object in the topological description of the automation system; the configuration step makes it possible to associate the logic controller within the hardware sense of the term with the topological object representing said logic controller in the topological description of the automation system.

In the same manner, the communication bus linking together the various devices/hardware may be represented in the topological description by an "Ethernet network" object associated during the configuration phase with a well-determined physical Ethernet network.

The system according to the invention finally includes a projects manager comprising projects intended to run on computers or logic controllers. For each software tool for management, monitoring, supervision, etc. of the automation system, a project is created in said projects manager. There consequently exists at least one monitoring project to which the monitoring facets are assigned and one supervision project to which the supervision facets are assigned.

Finally, the implementation of the system according to the invention comprises a "mapping" phase making it possible to match a functional object, for example a monitoring facet or a supervision facet, comprising tailored mapping interfaces, with hardware objects associated with topological objects of the topological description of the automation system. This feature is essential since it allows the user to have together on one and the same interface a picture of all the management aspects for his automation system, both as regards its functional aspects, of monitoring or supervision, and also its hardware aspects, while at the same time having a summary picture of the match between the functional parameters and the corresponding hardware parameters of said automation system.

In short and as described in the "prior art" paragraph, the management of one or more factories, of production lines or of any automation system involves the use of various programs or items of software, the function of each of them being to manage various specific levels of said automation system. Moreover, in order to address the various issues involved in improving productivity, the following objectives are generally pursued:
  reduction in engineering, operational and maintenance costs;
  constant improvement in production techniques and installations;
  improvement in the quality of the products manufactured;
  protection of persons, goods and the environment;
  increase in return on investment.

The system according to the invention is designed to best address these constraints by providing a global solution taking account of both the low-level programming aspects and global supervision, for the management of an automation system's production and maintenance operations.

This solution is implemented in particular by:
  a software environment allowing the user to manage the configuration of projects and applications describing an automation system;
  a single environment facilitating the management and maintenance of said automation system;
  libraries of object models;
  mechanisms for exchanging data between objects.

The invention claimed is:

1. A non-transitory computer readable medium storing software thereon that, when executed by a computer, causes the computer to design a system for managing an automation system, the automation system comprising:
  an applications manager comprising a single object-oriented functional description of said automation system, based on an object meta-model, said functional description comprising a plurality of composite functional objects which each comprise a monitoring facet and a supervision facet, each of said monitoring and supervision facets comprising a mapping interface;
  a topologies manager comprising an object-oriented topological description of said automation system, based on said object meta-model, and comprising a plurality of topological objects;

a projects manager comprising a monitoring project and a supervision project which relate to said automation system;

said monitoring facets being assigned to said monitoring project;

said supervision facets being assigned to said supervision project;

wherein part of said topological objects are mapped with said monitoring and supervision facets of part of said composite functional objects by way of said mapping interfaces.

2. The non-transitory computer readable medium according to claim 1, said automation system comprising a monitoring programmable logic controller able to run said monitoring project and a supervision computer able to run said supervision project.

3. The non-transitory computer readable medium according to claim 1, said automation system comprising a database comprising said functional description and said topological description.

4. The non-transitory computer readable medium according to claim 1, said composite functional objects comprising logic interfaces for connecting together said monitoring and supervision facets that they comprise.

5. The non-transitory computer readable medium according to claim 1, further comprising composite topological objects including at least two topological facets arising from a set of topological facets of a first type and from a set of topological facets of a second type.

6. The non-transitory computer readable medium according to claim 5, said composite topological objects comprising physical interfaces for connecting together said topological facets that they comprise.

7. The non-transitory computer readable medium according to claim 1, said topological objects comprising communication interfaces able to allow said topological objects to communicate with one another and to exchange data.

8. The non-transitory computer readable medium according to claim 1, further comprising an object models editor for creating said object meta-model including functional object models and topological object models.

9. The non-transitory computer readable medium according to claim 1, further comprising a topologies editor for graphically editing to create said topological description of the automation system.

10. The non-transitory computer readable medium according to claim 1, further comprising a functional editor for graphically editing to create said functional description of the automation system.

11. The non-transitory computer readable medium according to claim 1, further comprising a mapping editor for graphically mapping topological objects with functional facets comprising a mapping interface.

12. The non-transitory computer readable medium according to claim 1, wherein the monitoring facets correspond to at least first, second, and third sensors for sensing first, second, and third fill-levels of storage, the first, second, and third fill-levels being different from each other.

* * * * *